United States Patent
Goto et al.

(10) Patent No.: US 9,444,392 B2
(45) Date of Patent: Sep. 13, 2016

(54) MOTOR CONTROL DEVICE AND MOTOR CONTROL SYSTEM

(71) Applicant: MITSUBISHI ELECTRIC CORPORATION, Tokyo (JP)

(72) Inventors: Daisuke Goto, Tokyo (JP); Akira Tanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,332

(22) PCT Filed: Apr. 2, 2014

(86) PCT No.: PCT/JP2014/059716
§ 371 (c)(1),
(2) Date: Sep. 30, 2015

(87) PCT Pub. No.: WO2015/151241
PCT Pub. Date: Oct. 8, 2015

(65) Prior Publication Data
US 2016/0149532 A1  May 26, 2016

(51) Int. Cl.
G01R 31/02 (2006.01)
H02P 29/02 (2016.01)

(52) U.S. Cl.
CPC ................... *H02P 29/024* (2013.01)

(58) Field of Classification Search
CPC .......... H02P 29/024; G07B 17/00314; G07B 17/00112; G07B 17/00177; G07B 17/00322; G07B 17/00338; G01R 31/02
USPC .................. 318/490, 139, 565, 567; 340/648
See application file for complete search history.

(56) References Cited

U.S. PATENT DOCUMENTS 4,827,730 A * 5/1989 Doi ...................... G07C 5/0808
165/11.1
5,739,649 A * 4/1998 Akao .................... B60L 3/0023
318/139

(Continued)

FOREIGN PATENT DOCUMENTS

JP     1-286694 A    11/1989
JP     2-17511 A     1/1990

(Continued)

OTHER PUBLICATIONS

Decision of a Patent Grant of Japanese Patent Application No. 2014-537410, dated Sep. 24, 2014.

(Continued)

*Primary Examiner* — Rita Leykin
(74) *Attorney, Agent, or Firm* — Sughrue Mion, PLLC

(57) ABSTRACT

A motor control device includes: a control processing unit that controls the driving of a motor based on a command signal input from a controller and a detection signal which is a detection result of the operation of the motor; an abnormality determining unit that detects an abnormality in the controller, the motor control device, and the motor according to the command signal, the detection signal, and a control signal generated in the motor control device and that determines a level of repeatability of the detected abnormality on the basis of a predetermined criterion; a specific abnormality storage unit that stores occurrence information of a specific abnormality which is determined to have high repeatability on the basis of the predetermined criterion; and an abnormality releasing unit that erases the occurrence information of the specific abnormality stored in the specific abnormality storage unit according to an erasure command signal.

7 Claims, 4 Drawing Sheets

(56) References Cited

U.S. PATENT DOCUMENTS

| | | | | |
|---|---|---|---|---|
| 6,393,373 | B1* | 5/2002 | Duyar | G01R 31/343 |
| | | | | 318/490 |
| 8,004,221 | B2 | 8/2011 | Nakano et al. | |
| 8,253,365 | B2* | 8/2012 | Yeh | G01R 31/343 |
| | | | | 318/400.15 |
| 9,030,140 | B2* | 5/2015 | Yamanaka | B60R 16/03 |
| | | | | 318/400.3 |

FOREIGN PATENT DOCUMENTS

| | | | |
|---|---|---|---|
| JP | 3-118795 | A | 5/1991 |
| JP | 7-121232 | A | 5/1995 |
| JP | 8-221119 | A | 8/1996 |
| JP | 8-339217 | A | 12/1996 |
| JP | 9-292264 | A | 11/1997 |
| JP | 10-122917 | A | 5/1998 |
| JP | 11-69864 | A | 3/1999 |
| JP | 2005-341692 | A | 12/2005 |
| JP | 2008-263737 | A | 10/2008 |
| JP | 2009-142049 | A | 6/2009 |

OTHER PUBLICATIONS

International Search Report of PCT/JP2014/059716, dated Jul. 1, 2014. [PCT/ISA/210].
Written Opinion of PCT/JP2014/059716, dated Jul. 1, 2014. [PCT/ISA/237].

* cited by examiner

FIG.3

| ALARM | | |
|---|---|---|
| DATE AND TIME OF OCCURRENCE | MESSAGE | REPRODUCIBILITY OF ABNORMALITY |
| 15:04 FEBRUARY 6, 2014 | □□□□ ABNORMALITY | SPECIFIC ABNORMALITY HAVING HIGH REPEATABILITY |
| | | |
| | | |
| | | |
| | | |

FIG.4

| ALARM | | |
|---|---|---|
| DATE AND TIME OF OCCURRENCE | MESSAGE | REPRODUCIBILITY OF ABNORMALITY |
| 13:03 FEBRUARY 4, 2014 | ○○○○ ABNORMALITY | |
| | | |
| | | |
| | | |
| | | |

# MOTOR CONTROL DEVICE AND MOTOR CONTROL SYSTEM

CROSS REFERENCE TO RELATED APPLICATIONS

This application is a National Stage of International Application No. PCT/JP2014/059716 filed Apr. 2, 2014, the contents of all of which are incorporated herein by reference in their entirety.

FIELD

The present invention relates to a motor control device and a motor control system.

BACKGROUND

In general, a motor control system that controls driving of industrial machinery includes a motor that applies power to a drive target in the industrial machinery, a motor control device that controls driving of the motor by applying appropriate electric power to the motor, a controller that generates a position control command for the motor and outputs the generated position control command to the motor control device, and a detector that detects position information of the motor and transmits the detected position information to the motor control device. The motor control device controls the driving of the motor by applying appropriately electric power to the motor based on information input from the controller and the detector.

In general, the controller and the motor control device include, for example, unit that monitors an internal control state and a unit that detects an abnormality of a communication state with an equipment connected thereto, in addition to functions associated with the drive control of the motor. These units have a protection function of cutting off the supply of power to the motor and generating an alarm to call an operator's attention when occurrence of an abnormality is detected during the driving of the motor.

However, the protection function is carried out only when an abnormality occurs. A source which is an underlying cause of the abnormality occurrence is not removed, but only an abnormal state releasing operation, that is, an alarm state reset process such as pressing of an alarm reset button and re-application of electric power, can be performed. When only the alarm state reset process is performed, the alarm history (history of occurrence of an abnormal state) is stored in the controller and the motor control device. However, since a source which is an underlying cause of the abnormality occurrence is not removed, there is a problem in that the same abnormality as the abnormality of which an alarm has been released may occur when the motor is driven again.

For example, the following techniques have been proposed as an operation of the motor control device when an abnormality occurs. For example, Patent Literature 1 discloses a plant monitoring system that ranks a detected abnormality and displays a countermeasure against an abnormality having high emergency. For example, Patent Literature 2 discloses a mobile object control device and a control method thereof in which codes indicating operation states of a robot are stored in advance, the operation of the robot is inhibited in the case of an important abnormality code, and this history is stored in a nonvolatile memory. In this case, the operation of the robot is inhibited depending on details in the nonvolatile memory even after a reset operation.

CITATION LIST

Patent Literature

Patent Literature 1: Japanese Patent Application Laid-Open No. H2-17511
Patent Literature 2: Japanese Patent Application Laid-Open No. H8-339217

SUMMARY

Technical Problem

However, in the technique disclosed in Patent Literature 1, an abnormality is ranked and then a countermeasure against only an abnormality having high emergency is displayed. Accordingly, a countermeasure against an abnormality having low emergency but high repeatability is not displayed. As a result, only releasing of an alarm state using re-application of electric power or the like in a state in which investigation of a cause of the abnormality occurrence is not completed can be easily performed. When an alarm state resetting process is carelessly performed in a state in which the investigation of a cause of the abnormality occurrence is not completed and a source which is an underlying cause of the abnormality occurrence is not removed and the motor is driven again, there is a possibility that the same abnormality, erroneous operation, and the like will occur.

In the technique disclosed in Patent Literature 2, an important abnormality is determined to be a restoration inhibition abnormality, the robot is stopped, a restoration-disabled message is displayed, and all of a restoration command and the like are ignored. However, when an abnormality which is not fatal but is high in repeatability occurs, the operation can be easily restarted after the robot is restored to the original state in response to an operator's instruction in a state in which investigation of a cause of abnormality occurrence is not completed. When a clearing process of an abnormal state is carelessly performed in a state in which the investigation of a cause of the abnormality occurrence is not completed and a source which is an underlying cause of the abnormality occurrence has not been removed and the robot is driven again, there is a possibility that the same abnormality, erroneous operation, and the like will occur.

The present invention is made in consideration of the above-mentioned circumstances, and an object of the present invention is to provide a motor control device and a motor control system that can prevent occurrence of the same abnormality due to an easygoing release process on a specific abnormality having high repeatability.

Solution to Problem

In order to solve the aforementioned problems, a motor control device that is connected to a controller and a motor and that controls driving of the motor according to one aspect of the present invention is constructed to include: a control processing unit that controls the driving of the motor based on a command signal input from the controller so as to command an operation of the motor and a detection signal which is a detection result of the operation of the motor; an abnormality determining unit that detects an abnormality in the controller, the motor control device, and the motor, according to the command signal, the detection signal, and a control signal generated in the motor control device and that determines a level of repeatability of the detected abnormality on the basis of a predetermined criterion; a specific abnormality storage unit that stores occurrence information of a specific abnormality which is determined to have high repeatability on the basis of the predetermined criterion; and an abnormality releasing unit that erases the occurrence information of the specific abnormality stored in the specific abnormality storage unit based on an erasure command signal for commanding erasing of the occurrence information of the specific abnormality, wherein the control processing unit stops the driving of the motor while the occurrence information of the specific abnormality is stored in the specific abnormality storage unit, and is enabled to drive the motor when the occurrence information of the specific abnormality stored in the specific abnormality storage unit is erased by the abnormality releasing unit.

Advantageous Effects of Invention

According to the present invention, it is possible to provide a motor control device and a motor control system that can prevent occurrence of the same abnormality due to an easygoing release process on a specific abnormality having high repeatability.

BRIEF DESCRIPTION OF DRAWINGS

FIG. 3 is a diagram illustrating an example of indication of occurrence information of a specific abnormality (specific alarm display) on a display unit.

FIG. 4 is a diagram illustrating an example of indication of occurrence information of an abnormality having low repeatability other than the specific abnormality (alarm display) on the display unit.

DESCRIPTION OF EMBODIMENTS

Hereinafter, a motor control device and a motor control system according to embodiments of the present invention will be described in detail with reference to the accompanying drawings. The present invention is not limited to the following techniques, but can be properly modified in various forms without departing from the gist of the present invention.

First Embodiment

Figure 1:
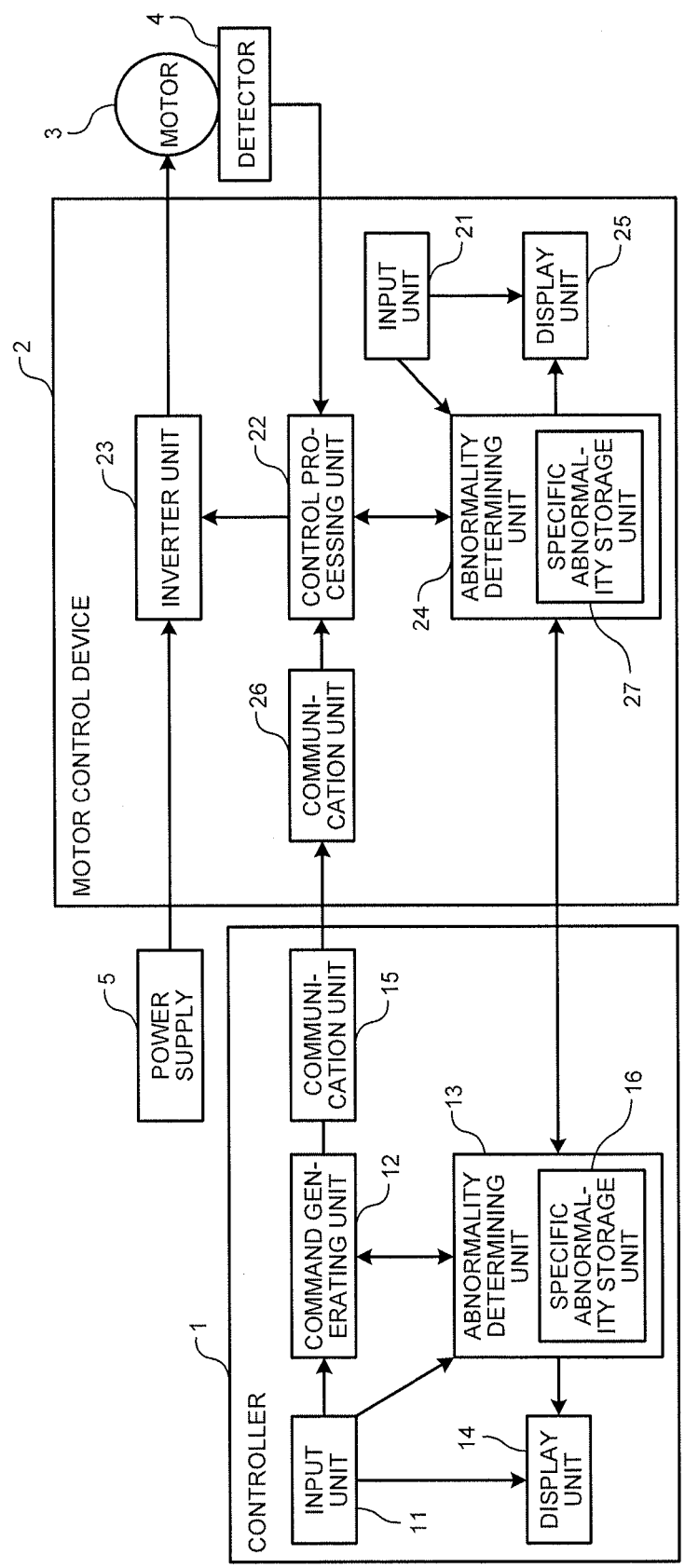
FIG. 1 is a block diagram illustrating the configuration of a motor control system according to a first embodiment of the present invention.

This embodiment relates to a motor control device and a motor control system that drive a motor of industrial machinery such as machine tools. FIG. 1 is a block diagram illustrating the configuration of the motor control system according to the first embodiment. The motor control system according to the first embodiment includes a controller 1, a motor control device 2, a motor 3, and a detector 4. The controller 1 and the motor control device 2 are connected to each other so as to communicate with each other by communication lines such as a communication network or an exclusive line. Similarly, the motor control device 2 and the detector 4 are connected to each other so as to communicate with each other by communication lines such as a communication network or an exclusive line.

The controller 1 generates a motor position command signal which is a position control command for the motor 3, which is necessary for causing the motor control device 2 to control the motor 3 so as to perform a desired operation, and other command signals and transmits the generated command signals to the motor control device 2. Details of the controller 1 will be described later.

The motor control device 2 controls driving of the motor 3 based on the motor position command signal input from the controller 1 and a detection signal (rotational angle information) which is a detection result of the operation of the motor 3 and which is input from the detector 4. That is, the motor control device 2 supplies appropriate electric power to the motor 3 such that the motor 3 operates to follow the motor position command signal. Details of the motor control device 2 will be described later.

The motor 3 is an actuator that converts the electric power supplied from the motor control device 2 into a rotational force of a motor shaft. The motor 3 drives a shaft of a machine (mechanical load) which is mechanically connected thereto by a linkage such as a coupling.

The detector 4 is an encoder which is mechanically connected to the motor 3, detects a rotational angle of the motor 3 which is an operation result of the motor 3, generates the detection signal of the motor 3 (rotational angle information of the motor 3), and outputs the detection signal to the motor control device 2.

Details of the controller 1 will be described below. The controller 1 includes an input unit 11, a command generating unit 12, an abnormality determining unit 13, a display unit 14, and a communication unit 15.

The input unit 11 is an interface used for an operator to input and set a variety of information for the controller 1, and various input devices such as a touch panel, a keyboard, and a pointing device are used as an example thereof. The input unit 11 may include an information reproducing device that reproduces information from a storage medium and a communication device to which information can be input from the outside by communication. An operator inputs and sets a motor operation condition, prepares and inputs a program for generating various signals, and the like using the input unit 11. Examples of the motor operation condition include parameters necessary for the motor control device 2 to control the motor 3 and operation conditions of the motor 3.

The command generating unit 12 generates a motor position command signal based on the motor operation condition input from the input unit 11 and outputs the generated motor position command signal to the motor control device 2. The command generating unit 12 also outputs the motor position command signal to the abnormality determining unit 13.

The abnormality determining unit 13 monitors observation signals such as the motor operation condition input from the input unit 11, the motor position command signal input from the command generating unit 12, and a control signal generated inside the motor control device and detects an abnormality in the controller 1 based on information acquired from the observation signals. When occurrence of an abnormality is detected, the abnormality determining unit 13 has a protection function of giving an alarm to call an operator's attention and cutting off the supply of electric power to the motor 3 to stop the motor 3, if necessary, during driving of the motor.

That is, the abnormality determining unit 13 outputs abnormality occurrence information (abnormal state) to the display unit 14 of the controller 1 and a display unit 25 of the motor control device 2 to be described later so as to display details of the abnormality. Accordingly, the abnormality occurrence and the abnormality details in the controller 1 are notified to an operator. The abnormality determining unit 13 outputs a motor stop signal, which is stop instructing information for cutting off the supply of electric power to the motor 3 to stop the motor, to the command generating unit 12 depending on the details of the detected abnormality. When, for example, the value received from the detector 4 is incorrect, the motor control device 2 stops the supply of electric power to the motor 3, and generates an alarm to notify the operator.

The abnormality determining unit 13 determines a level of repeatability of the detected abnormality based on a predetermined criterion. That is, the abnormality determining unit 13 determines whether the detected abnormality is a specific abnormality having high repeatability or an abnormality (abnormality having low repeatability), which is an abnormality different from the specific abnormality, other than a specific abnormality having high repeatability. As the predetermined criterion, information of the abnormality corresponding to the specific abnormality having high repeatability is stored, for example, as a list in the abnormality determining unit 13 in advance. The abnormality determining unit 13 determines whether the detected abnormality is the specific abnormality having high repeatability by referring to the list. The list may be stored in a place other than the abnormality determining unit 13 in the controller 1.

Here, examples of the specific abnormality having high repeatability in this description include an abnormality related to a process of supplying a current to the motor 3 and an abnormality related to a process of stopping the motor 3. Examples of the abnormality related to the process of supplying a current to the motor 3 include an abnormality in which the motor 3 is driven when the motor 3 has to be stopped (particularly, at the time of start) and an abnormality in which the motor 3 is not stopped but driven when the control of stopping the motor 3 is performed. Examples of the abnormality in which the motor 3 is driven when the motor 3 has to be stopped (particularly, at the time of start) include an abnormality of a start signal at the time of starting of the motor control system, an abnormality of the motor position command signal, and an abnormality of a power command signal to be described later. The abnormality determining unit 13 detects the abnormalities in the controller 1 among the above-mentioned abnormalities.

When the detected abnormality is a specific abnormality having high repeatability, the abnormality determining unit 13 stores the occurrence information of the specific abnormality (abnormal state) in a specific abnormality storage unit 16 in the abnormality determining unit 13. The specific abnormality storage unit 16 may be disposed independently of the abnormality determining unit 13. The abnormality determining unit 13 outputs the occurrence information of the specific abnormality to an abnormality determining unit 24 of the motor control device 2 to be described later.

When the detected abnormality is the specific abnormality having high repeatability, the abnormality determining unit 13 outputs the occurrence information of the specific abnormality (abnormal state) to the display unit 14 of the controller 1 and the display unit 25 of the motor control device 2 to be described later so as to display occurrence of the specific abnormality (specific alarm display). Accordingly, the occurrence of the specific abnormality and the abnormality details in the controller 1 can be notified to an operator to call the operator's attention.

The display unit 14 is a display unit that displays a display screen, an alarm display screen, and a variety of information including input information from the outside in the processes of the controller 1. The display unit 14 may be disposed outside the controller 1 to be connected to the controller 1.

The communication unit 15 is an information input and output unit that inputs and outputs a variety of information to and from the outside, for example, via a communication line such as an Internet line or an exclusive line.

Next, details of the motor control device 2 will be described below. The motor control device 2 includes an input unit 21, a control processing unit 22, an inverter unit 23, an abnormality determining unit 24, a display unit 25, and a communication unit 26.

The input unit 21 is an interface used for an operator to input and set a variety of information for the motor control device 2, and various input devices such as a touch panel, a keyboard, and a pointing device are used as an example thereof. The input unit 21 may include an information reproducing device that reproduces information from a storage medium and a communication device to which information can be input from the outside by communication. An operator inputs and sets a motor operation condition, prepares and inputs a program for generating various signals, and the like using the input unit 21.

The control processing unit 22 generates a power command signal for supplying appropriate electric power necessary for driving the motor 3 to the motor 3 and outputs the power command signal to the inverter unit 23. The control processing unit 22 calculates electric power to be supplied to the motor 3 according to the motor position command signal input from the controller 1 and a detection signal (rotational angle information of the motor 3) input from the detector 4 and generates the power command signal.

When an abnormality occurs in the motor control system and a motor stop signal is input from the command generating unit 12 of the controller 1 or the abnormality determining unit 24 of the motor control device 2, the control processing unit 22 stops the output of the power command signal to the inverter unit 23 to stop the driving of the motor 3 (alarm state) until a reset process is performed on the device in which the abnormality has occurred or the motor control system. The reset process is performed, for example, by a process of pressing a reset button of the device in which the abnormality has occurred or the motor control system, or by a process of re-applying electric power.

When the occurrence information of the specific abnormality is stored in at least one of the specific abnormality storage unit 16 of the controller 1 and a specific abnormality storage unit 27 of the motor control device 2 to be described later, the control processing unit 22 maintains the stopping of the driving of the motor 3 and maintains the alarm state unless the specific abnormality releasing process is performed.

The inverter unit 23 supplies suitable electric power necessary for driving the motor 3 to the motor 3 according to the power command signal input from the control processing unit 22. That is, the inverter unit 23 converts DC power supplied from a power supply 5 into AC power of arbitrary frequency and voltage using a well-known method and supplies the AC power to the motor 3. Accordingly, the motor 3 is rotationally driven.

The abnormality determining unit 24 monitors the observation signals such as the motor position command signal input from the command generating unit 12 of the controller 1, the detection signal output from the detector 4, and the control signal generated in the motor control device and detects an abnormality in the controller 1, the motor control device 2, and the motor 3 according to the observation signals. when occurrence of an abnormality is detected, the abnormality determining unit 24 has a protection function of giving an alarm to call an operator's attention and cutting off the supply of electric power to the motor 3 during the driving of the motor.

That is, when an abnormality is detected, the abnormality determining unit 24 outputs occurrence information of the abnormality (abnormal state) to the display unit 25 of the motor control device 2 and the display unit 14 of the controller 1 so as to display details of the abnormality. Accordingly, the occurrence of the abnormality in the motor control system and the details of the abnormality are notified to the operator. The abnormality determining unit 24 outputs a motor stop signal which is instruction information for cutting off the supply of electric power to the motor 3 to stop the motor to the control processing unit 22 in accordance with the details of the detected abnormality.

The abnormality determining unit 24 determines a level of repeatability of the detected abnormality on the basis of a predetermined criterion. That is, the abnormality determining unit 24 determines whether the detected abnormality is a specific abnormality having high repeatability or an abnormality (abnormality having low repeatability) other than the specific abnormality having high repeatability. As the predetermined criterion, information of the abnormality corresponding to the specific abnormality having high repeatability is stored, for example, as a list in the abnormality determining unit 24 in advance. The abnormality determining unit 24 determines whether the detected abnormality is the specific abnormality having high repeatability by referring to the list. The list may be stored in a place other than the abnormality determining unit 24 in the motor control device 2.

When the detected abnormality is a specific abnormality having high repeatability, the abnormality determining unit 24 stores the occurrence information of the specific abnormality (abnormal state) in the specific abnormality storage unit 27 in the abnormality determining unit 24. The specific abnormality storage unit 27 may be disposed independently of the abnormality determining unit 24. The abnormality determining unit 24 outputs the occurrence information of the specific abnormality to an abnormality determining unit 13 of the controller 1.

The specific abnormality storage unit 27 maintains storage of the occurrence information of the specific abnormality unless the specific abnormality releasing process is instructed from the input unit 11 of the controller 1 or the input unit 21 of the motor control device 2. That is, when the specific abnormality releasing process is instructed from the input unit 11 of the controller 1 or the input unit 21 of the motor control device 2, the abnormality determining unit 24 of the motor control device 2 functions as an abnormality releasing unit and erases the occurrence information of the specific abnormality stored in the specific abnormality storage unit 27. Similarly, when the specific abnormality releasing process is instructed from the input unit 11 of the controller 1 or the input unit 21 of the motor control device 2, the abnormality determining unit 13 of the controller 1 functions as an abnormality releasing unit and erases the occurrence information of the specific abnormality stored in the specific abnormality storage unit 16.

The specific abnormality releasing process is, for example, an input of an erasure command signal for commanding erasing of the occurrence information of the specific abnormality. The erasure command signal input from the input unit 21 of the motor control device 2 or the input unit 11 of the controller 1 is input to the abnormality determining unit 24 of the motor control device 2 and the abnormality determining unit 13 of the controller 1.

When the detected abnormality is the specific abnormality having high repeatability, the abnormality determining unit 24 outputs the occurrence information of the specific abnormality (abnormal state) to the display unit 25 of the motor control device 2 and the display unit 14 of the controller 1 so as to display occurrence of the specific abnormality (specific alarm display). Accordingly, the occurrence of the specific abnormality and the abnormality details in the motor control system can be notified to an operator to call the operator's attention.

The display unit 25 is a display unit that displays a display screen, an alarm display screen, and a variety of information including input information from the outside in the processes of the motor control device 2. The display unit 25 may be disposed outside the motor control device 2 to be connected to the motor control device 2.

The communication unit 26 is an information input and output unit that inputs and outputs a variety of information to and from the outside, for example, via a communication line such as an Internet line or an exclusive line. Transmission of information between the controller 1 and the motor control device 2 is performed via a main communication route passing through the communication unit 15 of the controller 1 and the communication unit 26 of the motor control device 2.

A sub communication route (communication line) other than the main communication route may be disposed between the controller 1 and the motor control device 2. For example, a sub communication route directly connecting the abnormality determining unit 13 of the controller 1 and the abnormality determining unit 24 of the motor control device 2 so as to communication with each other may be disposed. Accordingly, even when communication failure occurs in the main communication route passing through the communication units, information can be transmitted between the abnormality determining unit 13 of the controller 1 and the abnormality determining unit 24 of the motor control device 2 via the sub communication route.

Figure 2:
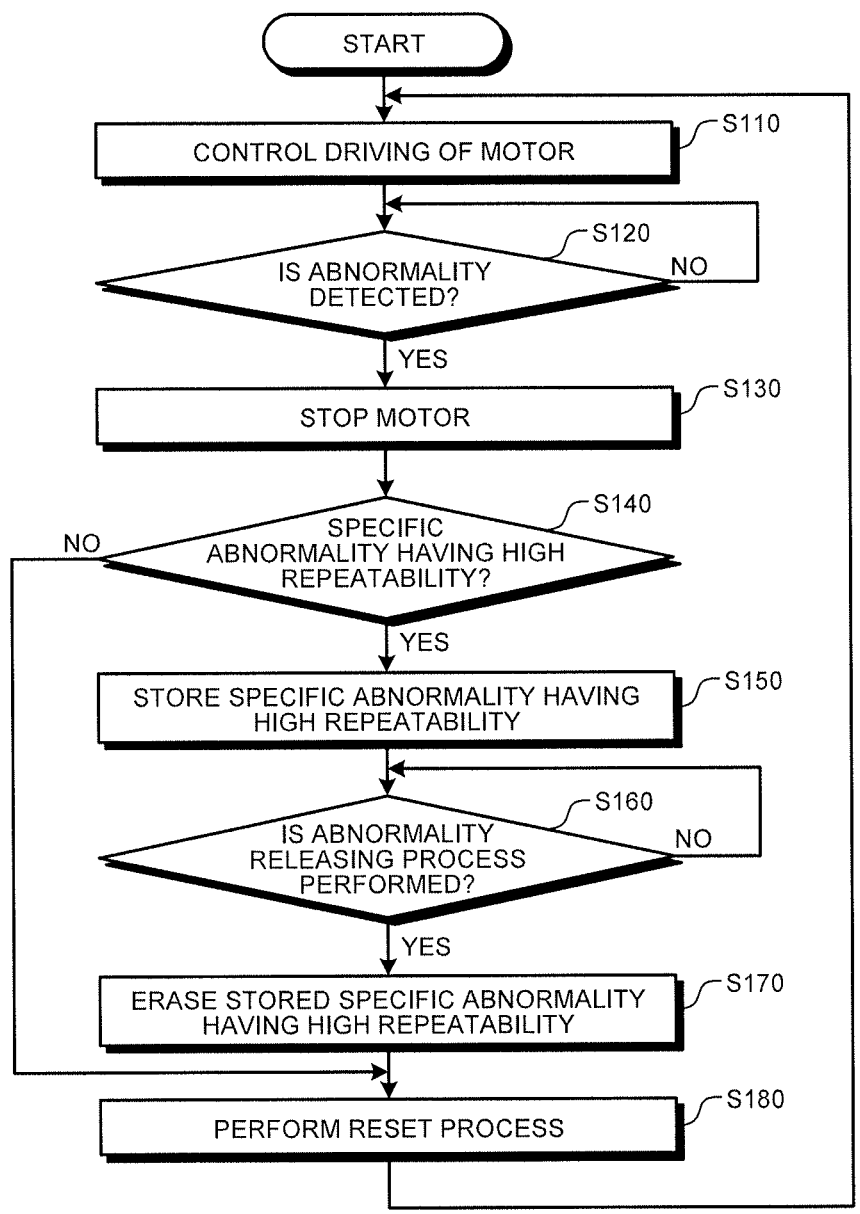
FIG. 2 is a flowchart illustrating a process flow of an alarm state releasing process when an abnormality is detected in the motor control system according to the first embodiment of the present invention.

Next, an alarm state releasing process when an abnormality is detected in the motor control system according to the first embodiment having the above-mentioned configuration will be described below. FIG. 2 is a flowchart illustrating a process flow of the alarm state releasing process when an abnormality is detected in the motor control system according to the first embodiment. In the following description, it is assumed that the detected abnormality is an abnormality in which it is necessary to stop the motor 3.

When the motor 3 is controlled by the motor control system, a motor operation condition is input from the input unit 11 of the controller 1 by an operator. The command generating unit 12 of the controller 1 generates a motor position command signal based on the motor operation condition input from the input unit 11 and outputs the motor position command signal to the control processing unit 22 of the motor control device 2. The command generating unit 12 also outputs the motor position command signal to the abnormality determining unit 13 of the controller 1.

The control processing unit 22 calculates electric power to be supplied to the motor 3 based on the motor position command signal input from the command generating unit 12 of the controller 1 and the detection signal output from the detector 4, generates the power command signal, and outputs the power command signal to the inverter unit 23. The inverter unit 23 supplies suitable electric power necessary for driving the motor 3 to the motor 3 based on the power command signal input from the control processing unit 22. Accordingly, the motor 3 is rotationally driven (step S110).

After the motor control system is started, the abnormality determining unit 24 of the motor control device 2 monitors the observation signals such as the motor position command signal input from the command generating unit 12 of the controller 1, the detection signal output from the detector 4, and the control signal generated in the motor control device and determines whether an abnormality has occurred in the motor control system (step S120). When an abnormality is not detected (No in step S120), the abnormality determining unit 24 of the motor control device 2 continues to monitor the observation signals by repeatedly performing the process of step S120.

On the other hand, when an abnormality is detected (Yes in step S120), the abnormality determining unit 24 of the motor control device 2 outputs the occurrence information of the abnormality to the display unit 14 of the controller 1 and the display unit 25 of the motor control device 2 so as to display the occurrence information (alarm display). Accordingly, the occurrence of the abnormality in the motor control system and the details of the abnormality are notified to the operator to call the operator's attention. The occurrence information of the abnormality may be displayed on any one of the display unit 14 of the controller 1 and the display unit 25 of the motor control device 2. The abnormality determining unit 24 of the motor control device 2 generates and outputs the motor stop signal to the control processing unit 22.

When the motor stop signal is input from the abnormality determining unit 24 of the motor control device 2, the control processing unit 22 stops the output of the power command signal to the inverter unit 23 to stop the driving of the motor 3 (step S130) until the reset process (a process of pressing a reset button or a process of re-applying electric power) is performed on the device in which the abnormality has occurred or the motor control system.

Then, the abnormality determining unit 24 of the motor control device 2 determines the level of repeatability of the detected abnormality. That is, the abnormality determining unit 24 determines whether the detected abnormality is a specific abnormality having high repeatability or an abnormality (abnormality having low repeatability) other than the specific abnormality having high repeatability (step S140).

When the detected abnormality is the specific abnormality having high repeatability (Yes in step S140), the abnormality determining unit 24 of the motor control device 2 outputs the occurrence information of the specific abnormality to the display unit 14 of the controller 1 and the display unit 25 of the motor control device 2 to display the occurrence information (specific alarm display). An alarm display of all abnormalities is performed by the display unit 14 of the controller 1 and the display unit 25 of the motor control device 2, but the indication of occurrence of the specific abnormality (specific alarm display) is performed in a manner different from that of the display of an abnormality having low repeatability other than the specific abnormality. The indication of occurrence of the specific abnormality is performed, for example, by the display of an additional message or colored display of an alarm display. Accordingly, the occurrence of the specific abnormality having high repeatability in the motor control system and the abnormality details are clearly notified to the operator and it is thus possible to more effectively call the operator's attention to a solution to a source which is an underlying cause.

FIG. 3 is a diagram illustrating an example of the indication of the occurrence information of the specific abnormality (specific alarm display) on the display unit 14 of the controller 1 and the display unit 25 of the motor control device 2. FIG. 4 is a diagram illustrating an example of the indication of occurrence information display of an abnormality having low repeatability other than the specific abnormality (alarm display) on the display unit 14 of the controller 1 and the display unit 25 of the motor control device 2. In the display illustrated in FIG. 3, an additional message indicating the occurrence of the specific abnormality is displayed in comparison with the display illustrated in FIG. 4. The occurrence information of the specific abnormality may be displayed on any one of the display unit 14 of the controller 1 and the display unit 25 of the motor control device 2.

When the detected abnormality is the specific abnormality having high repeatability, the abnormality determining unit 24 of the motor control device 2 stores the occurrence information of the specific abnormality (abnormal state) in the specific abnormality storage unit 27 in the abnormality determining unit 24 (step S150). Unless the specific abnormality releasing process is instructed from the input unit 11 of the controller 1 or the input unit 21 of the motor control device 2, the specific abnormality storage unit 27 maintains the stored occurrence information of the specific abnormality.

In the motor control system according to the first embodiment, when the occurrence information of the specific abnormality is stored in any one of the specific abnormality storage unit 16 of the controller 1 and the specific abnormality storage unit 27 of the motor control device 2, the occurrence information of the specific abnormality is also stored in the other specific abnormality storage unit and the storage states of the occurrence information of the specific abnormality are synchronized with each other.

The abnormality determining unit 24 of the motor control device 2 outputs the occurrence information of the specific abnormality to the abnormality determining unit 13 of the controller 1. When the occurrence information of the specific abnormality output from the abnormality determining unit 24 of the motor control device 2 is received, the abnormality determining unit 13 of the controller 1 stores the occurrence information of the specific abnormality unless the occurrence information of the specific abnormality is already stored therein.

Figure 5:
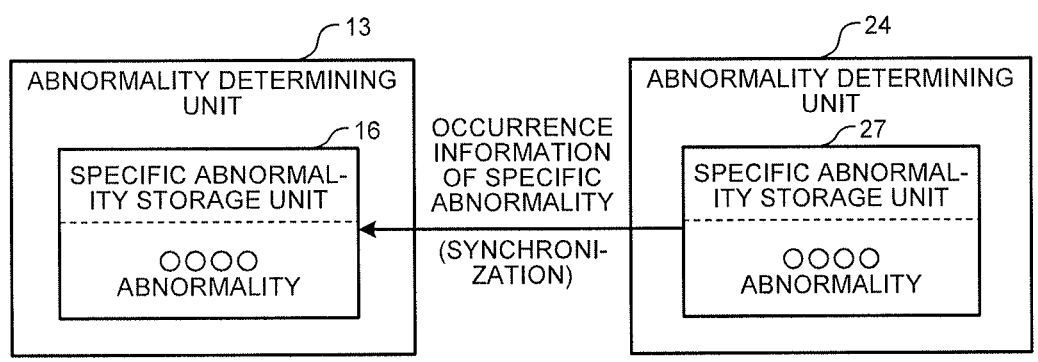
FIG. 5 is a diagram schematically illustrating a synchronization process of synchronizing a storage state of occurrence information of a specific abnormality in a specific abnormality storage unit of a controller with a storage state of the occurrence information of the specific abnormality in a specific abnormality storage unit of a motor control device.

In this case, the abnormality determining unit 13 of the controller 1 determines whether the occurrence information of the specific abnormality output from the abnormality determining unit 24 of the motor control device 2 is already stored in the specific abnormality storage unit 16 of the controller 1. When the occurrence information of the specific abnormality is not yet stored in the specific abnormality storage unit 16 of the controller 1, the abnormality determining unit 13 of the controller 1 stores the occurrence information of the specific abnormality in the specific abnormality storage unit 16. Accordingly, the storage state of the occurrence information of the specific abnormality in the specific abnormality storage unit 16 of the controller 1 can be synchronized with the storage state of the occurrence information of the specific abnormality in the specific abnormality storage unit 27 of the motor control device 2. FIG. 5 is a diagram schematically illustrating a synchronization process of synchronizing the storage state of the occurrence information of the specific abnormality in the specific abnormality storage unit 16 of the controller 1 with the storage state of the occurrence information of the specific abnormality in the specific abnormality storage unit 27 of the motor control device 2.

Thereafter, when the reset process (a process of pressing a reset button or a process of re-applying electric power) is performed on the device in which the abnormality has occurred or the motor control system, the control processing unit 22 acquires information on the storage state of the occurrence information of the specific abnormality in the specific abnormality storage unit 16 of the controller 1 or the specific abnormality storage unit 27 of the motor control device 2. Then, when the occurrence information of the specific abnormality is stored in at least one of the specific abnormality storage unit 16 of the controller 1 and the specific abnormality storage unit 27 of the motor control device 2, the control processing unit 22 maintains the stopping of the driving of the motor 3 and maintains the alarm state. That is, even when the reset process is performed, the control processing unit 22 maintains the state in which the output of the power command signal to the inverter unit 23 is stopped.

Then, the abnormality determining unit 24 of the motor control device 2 monitors whether the specific abnormality releasing process can be observed and determines whether or not the specific abnormality releasing process has been performed (step S160). That is, the abnormality determining unit 24 determines whether an input of the erasure command signal from the input unit 11 of the controller 1 or the input unit 21 of the motor control device 2 is present. The specific abnormality releasing process is performed by an operator based on the display details on the display unit 14 of the controller 1 and the display unit 25 of the motor control device 2. The erasure command signal is input to the abnormality determining unit 24 of the motor control device 2 and the abnormality determining unit 13 of the controller 1.

When the specific abnormality releasing process is performed, that is, when the erasure command signal is input (Yes in step S160), the abnormality determining unit 24 of the motor control device 2 erases the occurrence information of the specific abnormality stored in the specific abnormality storage unit 27 of the motor control device 2 (step S170). When the erasure command signal is received, the abnormality determining unit 13 of the controller 1 erases the occurrence information of the specific abnormality stored in the specific abnormality storage unit 16 of the controller 1 (step S170). As a result, the occurrence information of the specific abnormality is erased from both the specific abnormality storage unit 27 of the motor control device 2 and the specific abnormality storage unit 16 of the controller 1.

Accordingly, when the reset process (a process of pressing a reset button or a process of re-applying electric power) is performed on the device in which the abnormality has occurred or the motor control system, the control processing unit 22 can output the power command signal from the control processing unit 22 to the inverter unit 23.

Thereafter, when the reset process is performed on the device in which the abnormality has occurred or the motor control system (step S180), the driving of the motor 3 is restarted by the motor control device 2 (step S110).

On the other hand, when it is determined in step S160 that the specific abnormality releasing process has not been performed, that is, when an input of the erasure command signal is not present (No in step S160), the abnormality determining unit 24 of the motor control device 2 continues to monitor whether the specific abnormality releasing process is performed by repeatedly performing the process of step S160.

When it is determined in step S140 that the detected abnormality is not the specific abnormality having high repeatability (No in step S140), and the reset process is performed on the device in which the abnormality has occurred or the motor control system (step S180), the driving of the motor 3 is restarted by the motor control device 2 (step S110).

As described above, in the motor control system according to the first embodiment, when the occurrence information of the specific abnormality having high repeatability is stored in at least one of the specific abnormality storage unit 16 of the controller 1 and the specific abnormality storage unit 27 of the motor control device 2, the stopping of the driving of the motor 3 is maintained and the alarm state is maintained. The occurrence information of the specific abnormality stored in the specific abnormality storage unit 16 of the controller 1 and the specific abnormality storage unit 27 of the motor control device 2 is erased when the specific abnormality releasing process is performed (when the erasure command signal is input).

In the motor control system according to the first embodiment, the motor 3 can be safely and easily stopped until the specific abnormality releasing process is completed. Accordingly, it is possible to more effectively call the operator's attention at the occurrence of the specific abnormality having high repeatability and thus to prevent releasing of the alarm state through an easygoing reset process in a state in which the investigation of the cause of the abnormality occurrence has not been completed and a source which is an underlying cause of the abnormality occurrence has not been removed. As a result, when the specific abnormality having high repeatability occurs, it is possible to easily prevent occurrence of the same specific abnormality having high repeatability due to the easygoing reset process, uncontrollable error of machinery due to the specific abnormality and the like, by causing the operator to surely perform the specific abnormality releasing process.

In the motor control system according to the first embodiment, storage of the occurrence information of the specific abnormality is duplexed by storing the occurrence information of the specific abnormality in an external device other than the motor control device 2 in synchronization. Accordingly, even when a device in the motor control system is out of order or is replaced, it is possible to store the occurrence information of the specific abnormality in the motor control system, thereby achieving the above-mentioned advantageous effects.

The occurrence information of the specific abnormality may be stored only in the motor control device 2 instead of duplexing the storage of the occurrence information of the specific abnormality. In this case, when the occurrence information of the specific abnormality is stored in the motor control device 2, the driving of the motor 3 is stopped.

Therefore, according to the first embodiment, it is possible to prevent the easygoing release of the alarm state at the occurrence of the specific abnormality having high repeatability and thus to cause the same abnormality to occur again or sporadically.

Second Embodiment

In the first embodiment, the case in which the abnormality determining unit 24 of the motor control device 2 monitors the observation signals and determines whether an abnormality has occurred in the motor control system is described. In a second embodiment, a case in which the abnormality determining unit 13 of the controller 1 in the motor control system according to the first embodiment monitors the observation signals such as the motor position command signal and the control signal generated in the controller 1 and determines whether an abnormality has occurred in the motor control system will be described with reference to the flowchart illustrated in FIG. 2. The entire flow of the alarm state releasing process when an abnormality is detected in the second embodiment is the same as in the first embodiment.

When the motor control system is started and then the driving of the motor 3 is controlled by the motor control system (step S110), the abnormality determining unit 13 of the controller 1 monitors the observation signals such as the motor position command signal input from the command generating unit 12 of the controller 1 and the control signal generated in the controller 1, and determines whether an abnormality has occurred in the controller 1 (step S120). When an abnormality is not detected (No in step S120), the abnormality determining unit 13 of the controller 1 continues to monitor the observation signals by repeatedly performing the process of step S120.

On the other hand, when an abnormality is detected (Yes in step S120), the abnormality determining unit 13 of the controller 1 outputs the occurrence information of the abnormality to the display unit 14 of the controller 1 and the display unit 25 of the motor control device 2 so as to display the occurrence information (alarm display). Thus, the occurrence of the abnormality in the controller 1 and the details of the abnormality are notified to the operator to call the operator's attention. The abnormality determining unit 13 of the controller 1 generates and outputs the motor stop signal to the command generating unit 12. The command generating unit 12 outputs the motor stop signal to the control processing unit 22. The occurrence information of the abnormality may be displayed on any one of the display unit 14 of the controller 1 and the display unit 25 of the motor control device 2.

When the motor stop signal is input from the abnormality determining unit 13 of the controller 1, the control processing unit 22 stops the output of the power command signal to the inverter unit 23 to stop the driving of the motor 3 until the reset process (a process of pressing a reset button or a process of re-applying electric power) is performed on the device in which the abnormality has occurred or the motor control system (step S130).

Then, the abnormality determining unit 13 of the controller 1 determines the level of repeatability of the detected abnormality. That is, the abnormality determining unit 13 determines whether the detected abnormality is a specific abnormality having high repeatability or an abnormality (abnormality having low repeatability) other than the specific abnormality having high repeatability (step S140). Here, the criterion for determining the level of repeatability of the abnormality in the abnormality determining unit 13 of the controller 1 is the same as the criterion for determining the level of repeatability of the abnormality in the abnormality determining unit 24 of the motor control device 2.

When the detected abnormality is the specific abnormality having high repeatability (Yes in step S140), the abnormality determining unit 13 of the controller 1 outputs the occurrence information of the specific abnormality to the display unit 14 of the controller 1 and the display unit 25 of the motor control device 2 so as to display the occurrence information (specific alarm display). The alarm display of all abnormalities is performed by the display unit 14 of the controller 1 and the display unit 25 of the motor control device 2, but the indication of the occurrence of the specific abnormality is performed in a manner different from the display of an abnormality other than the specific abnormality. Accordingly, the occurrence of the specific abnormality having high repeatability in the motor control system and the abnormality details are clearly notified to the operator and it is thus possible to more effectively call the operator's attention to a solution to a source which is an underlying cause. The occurrence information of the specific abnormality may be displayed on any one of the display unit 14 of the controller 1 and the display unit 25 of the motor control device 2.

When the detected abnormality is the specific abnormality having high repeatability, the abnormality determining unit 13 of the controller 1 stores the occurrence information of the specific abnormality (abnormal state) in the specific abnormality storage unit 16 in the abnormality determining unit 13 (step S150). The specific abnormality storage unit 16 maintains the storage of the occurrence information of the specific abnormality unless the specific abnormality releasing process is instructed from the input unit 11 of the controller 1 or the input unit 21 of the motor control device 2.

The abnormality determining unit 13 of the controller 1 outputs the occurrence information of the specific abnormality to the abnormality determining unit 24 of the motor control device 2. When the occurrence information of the specific abnormality output from the abnormality determining unit 13 of the controller 1 is received, the abnormality determining unit 24 of the motor control device 2 stores the occurrence information of the specific abnormality unless the occurrence information of the specific abnormality is already stored therein.

Figure 6:
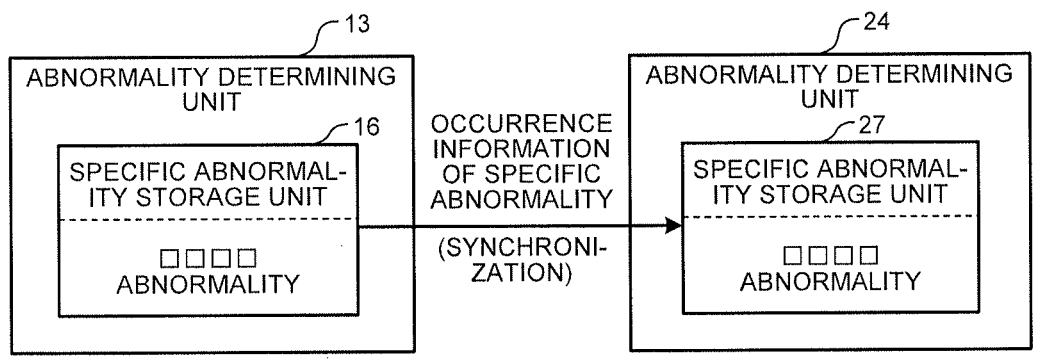
FIG. 6 is a diagram schematically illustrating a synchronization process of synchronizing a storage state of occurrence information of a specific abnormality in the specific abnormality storage unit of the motor control device with a storage state of the occurrence information of the specific abnormality in the specific abnormality storage unit of the controller.

In this case, the abnormality determining unit 24 of the motor control device 2 determines whether the occurrence information of the specific abnormality output from the abnormality determining unit 13 of the controller 1 is stored in the specific abnormality storage unit 27 of the motor control device 2. If the occurrence information of the specific abnormality is not stored in the specific abnormality storage unit 27 of the motor control device 2, the abnormality determining unit 24 of the motor control device 2 stores the occurrence information of the specific abnormality in the specific abnormality storage unit 27 of the motor control device 2. Accordingly, the storage state of the occurrence information of the specific abnormality in the specific abnormality storage unit 27 of the motor control device 2 can be synchronized with the storage state of the occurrence information of the specific abnormality in the specific abnormality storage unit 16 of the controller 1. FIG. 6 is a diagram schematically illustrating a synchronization process of synchronizing the storage state of occurrence information of the specific abnormality in the specific abnormality storage unit 27 of the motor control device 2 with the storage state of the occurrence information of the specific abnormality in the specific abnormality storage unit 16 of the controller 1.

Thereafter, when the reset process is performed on the device or the motor control system in which the abnormality has occurred, the control processing unit 22 acquires information of the storage state of the occurrence information of the specific abnormality in the specific abnormality storage unit 16 of the controller 1 or the specific abnormality storage unit 27 of the motor control device 2. Then, when the occurrence information of the specific abnormality is stored in at least one of the specific abnormality storage unit 16 of the controller 1 and the specific abnormality storage unit 27 of the motor control device 2, the control processing unit 22 maintains the stopping of the driving of the motor 3. That is, even when the reset process is performed, the control processing unit 22 maintains the state in which the output of the power command signal to the inverter unit 23 is stopped.

Then, the abnormality determining unit 13 of the controller 1 monitors whether the specific abnormality releasing process can be observed and determines whether the specific abnormality releasing process has been performed (step S160). That is, the abnormality determining unit 13 of the controller 1 determines whether an input of the erasure command signal from the input unit 11 of the controller 1 or the input unit 21 of the motor control device 2 is present. The erasure command signal is input to the abnormality determining unit 24 of the motor control device 2 and the abnormality determining unit 13 of the controller 1.

When the specific abnormality releasing process is performed, that is, when the erasure command signal is input (Yes in step S160), the abnormality determining unit 13 of the controller 1 erases the occurrence information of the specific abnormality stored in the specific abnormality storage unit 16 of the controller 1 (step S170). The abnormality determining unit 24 of the motor control device 2 erases the occurrence information of the specific abnormality stored in the specific abnormality storage unit 27 of the motor control device 2 (step S170). As a result, the occurrence information of the specific abnormality is erased from both the specific abnormality storage unit 27 of the motor control device 2 and the specific abnormality storage unit 16 of the controller 1. Accordingly, when the reset process is performed on the device in which the abnormality has occurred or the motor control system, the control processing unit 22 can output the power command signal from the control processing unit 22 to the inverter unit 23.

Thereafter, when the reset process is performed on the device in which the abnormality has occurred or the motor control system, the driving of the motor 3 is restarted by the motor control device 2 (step S110).

On the other hand, when it is determined in step S160 that the specific abnormality releasing process has not been performed, that is, when an input of the erasure command signal is not present (No in step S160), the abnormality determining unit 13 of the controller 1 continues to monitor whether the specific abnormality releasing process is performed by repeatedly performing the process of step S160.

When it is determined in step S140 that the detected abnormality is not the specific abnormality having high repeatability (No in step S140) and the reset process is performed on the device in which the abnormality has occurred or the motor control system (step S180), the driving of the motor 3 is restarted by the motor control device 2 (step S110).

In the second embodiment, similarly to the first embodiment, the motor 3 can be safely and easily stopped until the specific abnormality releasing process is completed. Accordingly, it is possible to more effectively call the operator's attention at the occurrence of the specific abnormality having high repeatability and thus to prevent the alarm state release through an easygoing reset process in a state in which the investigation of the cause of the abnormality occurrence has not been completed and a source which is an underlying cause of the abnormality occurrence has not been removed. As a result, when the specific abnormality having high repeatability occurs, it is possible to easily prevent occurrence of the same specific abnormality having high repeatability due to the easygoing reset process, uncontrollable error of machinery due to the specific abnormality, and like by surely causing the operator to perform the specific abnormality releasing process.

Therefore, according to the second embodiment, similarly to the first embodiment, it is possible to prevent the easygoing release of the alarm state at the occurrence of the specific abnormality having high repeatability and thus to prevent the same abnormality from occurring again or sporadically.

Third Embodiment

In a third embodiment, a case in which the motor control device 2 in which the occurrence information of the specific abnormality is stored in the specific abnormality storage unit 27 is replaced with a new motor control device will be described. As described above, the specific abnormality storage unit 16 of the controller 1 is synchronized in the storage state with the specific abnormality storage unit 27 of the motor control device 2 in which the occurrence information of the specific abnormality is stored. Accordingly, in the specific abnormality storage unit 16 of the controller 1 which has not been replaced, the occurrence information of the specific abnormality is stored.

When the motor control system is started, the abnormality determining unit 24 of the new motor control device checks whether the occurrence information of the specific abnormality is stored in the specific abnormality storage unit 16 of the controller 1. For example, the abnormality determining unit 24 of the new motor control device transmits a request signal for requesting for the occurrence information of the specific abnormality to the abnormality determining unit 13 of the controller 1. When the occurrence information of the specific abnormality is stored in the specific abnormality storage unit 16, the abnormality determining unit 13 of the controller 1 having received the request signal transmits the occurrence information of the specific abnormality to the abnormality determining unit 24 of the new motor control device.

The abnormality determining unit 24 of the new motor control device receives the occurrence information of the specific abnormality and stores the received occurrence information of the specific abnormality in the specific abnormality storage unit 27 of the new motor control device. Accordingly, the specific abnormality storage unit 27 of the new motor control device is synchronized in the storage state with the specific abnormality storage unit 16 of the controller 1. Therefore, the specific abnormality storage unit 27 of the new motor control device enters the same state as step S150 described in the first embodiment and can perform the alarm state releasing process when an abnormality is detected after step S150 described in the first embodiment.

The occurrence information of the specific abnormality may be stored in an external device other than the controller 1 in advance in synchronization with each other. In this case, when the motor control system is started, the abnormality determining unit 24 of the new motor control device acquires the occurrence information of the specific abnormality from the external device in the same way as described above and stores the acquired occurrence information of the specific abnormality in the specific abnormality storage unit 27 of the new motor control device. An example of the external device is the detector 4.

As described above, in the third embodiment, even when the motor control device 2 of the motor control system is replaced with a new motor control device, the new motor control device can acquire the occurrence information of the specific abnormality from the specific abnormality storage unit 16 of the controller 1 and store the acquired occurrence information of the specific abnormality.

Therefore, according to the third embodiment, even when the motor control device 2 of the motor control system is replaced with a new motor control device, it is possible to prevent the easygoing release of the alarm state at the occurrence of the specific abnormality having high repeatability, and thus to prevent the same abnormality from occurring again or sporadically, similarly to the first embodiment.

Fourth Embodiment

In a fourth Embodiment, a case in which the controller 1 in which the occurrence information of the specific abnormality is stored in the specific abnormality storage unit 16 is replaced with a new controller will be described. As described above, the specific abnormality storage unit 27 of the motor control device 2 is synchronized in the storage state with the specific abnormality storage unit 16 of the controller 1 in which the occurrence information of the specific abnormality is stored. Accordingly, the occurrence information of the specific abnormality is stored in the specific abnormality storage unit 27 of the motor control device 2 which has not been replaced.

When the motor control system is started, the abnormality determining unit 13 of the new controller checks whether the occurrence information of the specific abnormality is stored in the specific abnormality storage unit 27 of the motor control device 2. For example, the abnormality determining unit 13 of the new controller transmits a request signal for requesting for the occurrence information of the specific abnormality to the abnormality determining unit 24 of the motor control device 2. If the occurrence information of the specific abnormality is already stored in the specific abnormality storage unit 27, the abnormality determining unit 24 of the motor control device 2 having received the request signal transmits the occurrence information of the specific abnormality to the abnormality determining unit 13 of the new controller.

The abnormality determining unit 13 of the new controller receives the occurrence information of the specific abnormality and stores the received occurrence information of the specific abnormality in the specific abnormality storage unit 16 of the new controller. Accordingly, the specific abnormality storage unit 16 of the new controller is synchronized in the storage state with the specific abnormality storage unit 27 of the motor control device 2. Therefore, the specific abnormality storage unit 16 of the new controller enters the same state as step S150 described in the second embodiment and can perform the alarm state releasing process when an abnormality is detected in the process after step S150 described in the second embodiment.

The occurrence information of the specific abnormality may be stored in an external device other than the controller 1 in advance in synchronization with each other. In this case, when the motor control system is started, the abnormality determining unit 13 of the new controller acquires the occurrence information of the specific abnormality from the external device in the same way as described above and stores the acquired occurrence information of the specific abnormality in the specific abnormality storage unit 16 of the new controller.

As described above, in the fourth embodiment, even when the controller 1 of the motor control system is replaced with a new controller, the new controller can acquire the occurrence information of the specific abnormality from the specific abnormality storage unit 27 of the motor control device 2 and store the acquired occurrence information of the specific abnormality.

Therefore, according to the fourth embodiment, even when the controller 1 of the motor control system is replaced with a new controller, it is possible to prevent the easygoing release of the alarm state at the occurrence of the specific abnormality having high repeatability and thus to prevent the same abnormality from occurring again or sporadically, similarly to the second embodiment.

The configurations described in the above-mentioned embodiments can be arbitrarily selected and combined without departing from the gist of the present invention.

INDUSTRIAL APPLICABILITY

As described above, the motor control device according to the present invention is useful for preventing re-occurrence and sporadic occurrence of the same abnormality due to the easygoing release of an alarm state at the occurrence of a specific abnormality having high repeatability.

REFERENCE SIGNS LIST

1 Controller
2 Motor Control Device
3 Motor
4 Detector
5 Power Supply
11 Input Unit
12 Command Generating Unit
13 Abnormality Determining Unit
14 Display Unit
15 Communication Unit
16 Specific Abnormality Storage Unit
21 Input Unit
22 Control Processing Unit
23 Inverter Unit
24 Abnormality Determining Unit
25 Display Unit
26 Communication Unit
27 Specific Abnormality Storage Unit

The invention claimed is:
1. A motor control device that is connected to a controller and a motor and that controls driving of the motor, the motor control device comprising:
a control processing unit to control the driving of the motor based on a command signal input from the controller so as to command an operation of the motor and a detection signal which is a detection result of the operation of the motor;

an abnormality determining unit to detect an abnormality in the controller, the motor control device, and the motor, according to the command signal, the detection signal, and a control signal generated in the motor control device and to determine a level of repeatability of the detected abnormality on the basis of a predetermined criterion;

a specific abnormality storage unit to store occurrence information of a specific abnormality which is determined to have high repeatability on the basis of the predetermined criterion; and an abnormality releasing unit to erase the occurrence information of the specific abnormality stored in the specific abnormality storage unit based on an erasure command signal for commanding erasing of the occurrence information of the specific abnormality, wherein the control processing unit stops the driving of the motor while the occurrence information of the specific abnormality is stored in the specific abnormality storage unit, and is enabled to drive the motor when the occurrence information of the specific abnormality stored in the specific abnormality storage unit is erased by the abnormality releasing unit.

2. The motor control device according to claim 1, wherein the abnormality determining unit stops the driving of the motor when the occurrence information of the specific abnormality is stored in at least one of the specific abnormality storage unit and an external device connected to the motor control device.

3. The motor control device according to claim 2, wherein the abnormality determining unit synchronizes a storage state of the occurrence information of the specific abnormality in the specific abnormality storage unit with a storage state of the occurrence information of the specific abnormality in the external device.

4. The motor control device according to claim 3, wherein the abnormality determining unit outputs the occurrence information of the specific abnormality stored in the specific abnormality storage unit to the external device and stores the occurrence information of the specific abnormality in the external device.

5. The motor control device according to claim 3, wherein the specific abnormality storage unit stores the occurrence information of the specific abnormality input from the external device.

6. The motor control device according to claim 2, wherein the external device is the controller.

7. A motor control system comprising:

the motor control device according to claim 1;

a motor;

a detector that is connected to the motor and that generates a detection signal which is a detection result of an operation of the motor and inputs the detection signal to the motor control device; and a controller to generate a command signal for commanding the operation of the motor and inputs the command signal to the motor control device.

* * * * *